(12) United States Patent
Miyake et al.

(10) Patent No.: US 11,169,500 B2
(45) Date of Patent: Nov. 9, 2021

(54) CONTROL SYSTEM, CONTROL DEVICE AND CONTROL PROGRAM FOR VERIFYING SOUNDNESS OF DATA ON A TRANSMISSION PATH

(71) Applicant: OMRON Corporation, Kyoto (JP)

(72) Inventors: Kazunari Miyake, Omihachiman (JP); Shigeyuki Eguchi, Joyo (JP); Takamasa Ueda, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/477,532

(22) PCT Filed: Nov. 20, 2017

(86) PCT No.: PCT/JP2017/041653
§ 371 (c)(1),
(2) Date: Jul. 12, 2019

(87) PCT Pub. No.: WO2018/154884
PCT Pub. Date: Aug. 30, 2018

(65) Prior Publication Data
US 2019/0361418 A1      Nov. 28, 2019

(30) Foreign Application Priority Data

Feb. 22, 2017 (JP) .............................. JP2017-030834

(51) Int. Cl.
*G05B 19/05*     (2006.01)
*G05B 23/02*     (2006.01)
(Continued)

(52) U.S. Cl.
CPC .............. *G05B 19/05* (2013.01); *G05B 23/02* (2013.01); *G06F 8/70* (2013.01); *G06F 9/44* (2013.01); *H04L 12/28* (2013.01)

(58) Field of Classification Search
None
See application file for complete search history.

(56) References Cited

U.S. PATENT DOCUMENTS

| | | | |
|---|---|---|---|
| 5,742,624 A * | 4/1998 | Irie ...................... | G05B 19/058 714/799 |
| 7,024,463 B1 * | 4/2006 | Hitomi ................. | G05B 19/052 709/201 |

(Continued)

FOREIGN PATENT DOCUMENTS

| | | |
|---|---|---|
| CN | 105629923 | 6/2016 |
| DE | 102010020504 | 11/2011 |

(Continued)

OTHER PUBLICATIONS

"International Preliminary Report on Patentability (Form PCT/IPEA/409) of PCT/JP2017/041653," completed on Sep. 3, 2018, with English translation thereof, pp. 1-10.

(Continued)

*Primary Examiner* — Jason D Mitchell
(74) *Attorney, Agent, or Firm* — JCIPRNET

(57) ABSTRACT

Provided is a control system, comprising: a processing unit which executes a user program; one or a plurality of function units; one or a plurality of communication units which relay data between the processing unit and the one or the plurality of function units; and a reflection means which, when in the user program a variable is designated which has been associated with any of the data which the function units retain and which denotes the validity of the data, reflects, as the value which the variable denotes, a result of having aggregated states of each of the communication units which are present upon a transmission path from the function units which retain the designated data to the processing unit.

14 Claims, 13 Drawing Sheets

(51) Int. Cl.
*G06F 8/70* (2018.01)
*G06F 9/44* (2018.01)
*H04L 12/28* (2006.01)

(56) References Cited

U.S. PATENT DOCUMENTS

| | | | | |
|---|---|---|---|---|
| 7,475,393 | B2* | 1/2009 | Essick, IV | G06F 9/3001 |
| | | | | 712/229 |
| 7,822,495 | B2* | 10/2010 | Nixon | G06F 8/40 |
| | | | | 700/87 |
| 10,375,615 | B2* | 8/2019 | Shimoji | H04B 5/0031 |
| 2003/0016677 | A1* | 1/2003 | Mauritz | H04L 45/06 |
| | | | | 370/400 |
| 2005/0195827 | A1* | 9/2005 | Yao | H04J 3/0676 |
| | | | | 370/395.4 |
| 2009/0051309 | A1* | 2/2009 | Rehm | H02H 7/0844 |
| | | | | 318/494 |
| 2016/0091883 | A1* | 3/2016 | Fujiwara | G05B 19/058 |
| | | | | 700/3 |
| 2017/0068229 | A1* | 3/2017 | Yaoita | G05B 19/042 |
| 2017/0139393 | A1* | 5/2017 | Boss | G05B 19/058 |

FOREIGN PATENT DOCUMENTS

| | | |
|---|---|---|
| EP | 2990896 | 3/2016 |
| JP | S58500090 | 1/1983 |
| JP | H07114412 | 5/1995 |
| JP | H086614 | 1/1996 |
| JP | H08211908 | 8/1996 |
| JP | 2002278606 | 9/2002 |
| JP | 2004094354 | 3/2004 |
| JP | 2007108923 | 4/2007 |
| JP | 2014099061 | 5/2014 |
| JP | 2015001758 | 1/2015 |
| JP | 2015176370 | 10/2015 |
| JP | 2016099879 | 5/2016 |
| WO | 1994004969 | 3/1994 |
| WO | 2005060168 | 6/2005 |

OTHER PUBLICATIONS

"International Search Report (Form PCT/ISA/210) of PCT/JP2017/041653," dated Dec. 26, 2017, with English translation thereof, pp. 1-4.

"Written Opinion of the International Searching Authority (Form PCT/ISA/237) of PCT/JP2017/041653," dated Dec. 26, 2017, with English translation thereof, pp. 1-8.

"Search Report of Europe Counterpart Application", dated Nov. 6, 2020, p. 1-p. 9.

"Office Action of China Counterpart Application" with English translation thereof, dated Aug. 10, 2021, p. 1-p. 20.

* cited by examiner

⇓
Compilation

CONTROL SYSTEM, CONTROL DEVICE AND CONTROL PROGRAM FOR VERIFYING SOUNDNESS OF DATA ON A TRANSMISSION PATH

CROSS-REFERENCE TO RELATED APPLICATION

This application is a 371 of international application of PCT application serial no. PCT/JP2017/041653, filed on Nov. 20, 2017, which claims the priority benefit of Japan application no. 2017030834, filed on Feb. 22, 2017. The entirety of each of the above-mentioned patent applications is hereby incorporated by reference herein and made a part of this specification.

TECHNICAL FIELD

The present invention relates to a networked control system, a control device included in such a control system, and a control program directed to such a control device.

RELATED ART

With the advances in information and communication technology (ICT) in recent years, networking and multifunctionalization of various devices used at manufacturing sites are in progress. As an example, a system that connects a control device such as a programmable controller (PLC) or the like, an input/output (I/O) device such as a sensor or a relay or the like, and an actuator such as an inverter or a motor driver or the like and so on by a network and integrates them has been put into practical use.

On the other hand, in a user program executed by the control device, there is also a demand that processing must be executed while soundness of the sensor or the like is being checked. In a networked control system, it is necessary to collect and monitor states of each machine connected to the network. For example, Japanese Laid-Open No. 2007-108923 (Patent Document 1) discloses a configuration including one master unit and slice communication units connected to a field bus, wherein states of each slice communication unit can be monitored by a state flag.

PRIOR-ART DOCUMENTS

Patent Documents

Patent Document 1: Japanese Laid-open No. 2007-108923

SUMMARY OF THE INVENTION

Problems to be Solved by the Invention

As networking of a control system becomes more advanced, there is a problem that the number of units to be monitored increases, soundness of all the targets to be monitored needs to be considered, and efficiency of creation of the user program is reduced.

A configuration capable of realizing efficient programming even in a multistage or highly networked control system has been desired.

Means for Solving the Problems

A control system according to an embodiment of the present invention includes: a processing unit that executes a user program; one or a plurality of function units; one or a plurality of communication units that relay data between the processing unit and the one or plurality of function units; and a reflection means that, when a variable associated with any data held by the function units and indicating validity of the data is designated in the user program, reflects, as a value indicated by the variable, a result of aggregation of states of each of the communication units present on a transmission path from the function units holding designated data to the processing unit.

Preferably, the reflection means includes a means of analyzing a source code of the user program in which the variable is designated and specifying one or a plurality of communication units related to determination of the value indicated by the variable, and a means of, after adding to the source code a command for determining the value indicated by the variable from a set of values indicating the state of the specified one or plurality of communication units, generating an object code of the user program.

Preferably, the control system further includes a support device connected to the processing unit, and the reflection means is implemented in the support device.

Preferably, the reflection means includes a means of analyzing a source code of the user program in which the variable is designated and specifying one or a plurality of communication units related to determination of the value indicated by the variable, and a means of adding a function of updating and holding the value indicated by the variable based on the specified information in the processing unit.

Preferably, the control system further includes a support device connected to the processing unit, wherein the support device performs analysis of the source code of the user program and transmits information specified by the analysis to the processing unit.

Preferably, the reflection means includes, in the processing unit, a means of, in response to target data and a variable name associated with the target data, specifying the function units holding the target data, and specifying a transmission path from the specified function units to the processing unit, and a means of adding a command for updating, as the value indicated by the designated variable, the result of aggregation of the states of each of the communication units present on the specified transmission path every predetermined cycle.

Preferably, the value indicated by the variable is configured to be accessible from an external device connected to the processing unit.

Preferably, a network is configured in which a predetermined protocol is followed between the communication units.

A control device according to an embodiment of the present invention includes a processing unit that executes a user program, and a communication interface for communicating with one or a plurality of function units. One or a plurality of communication units that relay data are disposed between the processing unit and the one or plurality of function units. The control device includes a reflection means that, when a variable associated with any data held by the function units and indicating validity of the data is designated in the user program, reflects, as a value indicated by the variable, a result of aggregation of states of each of the communication units present on a transmission path from the function units holding designated data to the processing unit.

According to an embodiment of the present invention, a control program executed by a computer is provided. The computer includes a processing unit that executes a user program, and a communication interface for communicating with one or a plurality of function units. One or a plurality of communication units that relay data are disposed between the processing unit and the one or plurality of function units. The control program causes the computer to execute: a step of, when a variable associated with any data held by the function units and indicating validity of the data is designated in the user program, specifying a transmission path from the function units holding designated data to the processing unit and the communication units present on the specified transmission path; and a step of reflecting, as a value indicated by the variable, a result of aggregation of states of each of the specified communication units.

Effects of the Invention

According to the embodiments of the present invention, efficient programming can be realized even in a multistage or highly networked control system.

DESCRIPTION OF THE EMBODIMENTS

Figure 1:
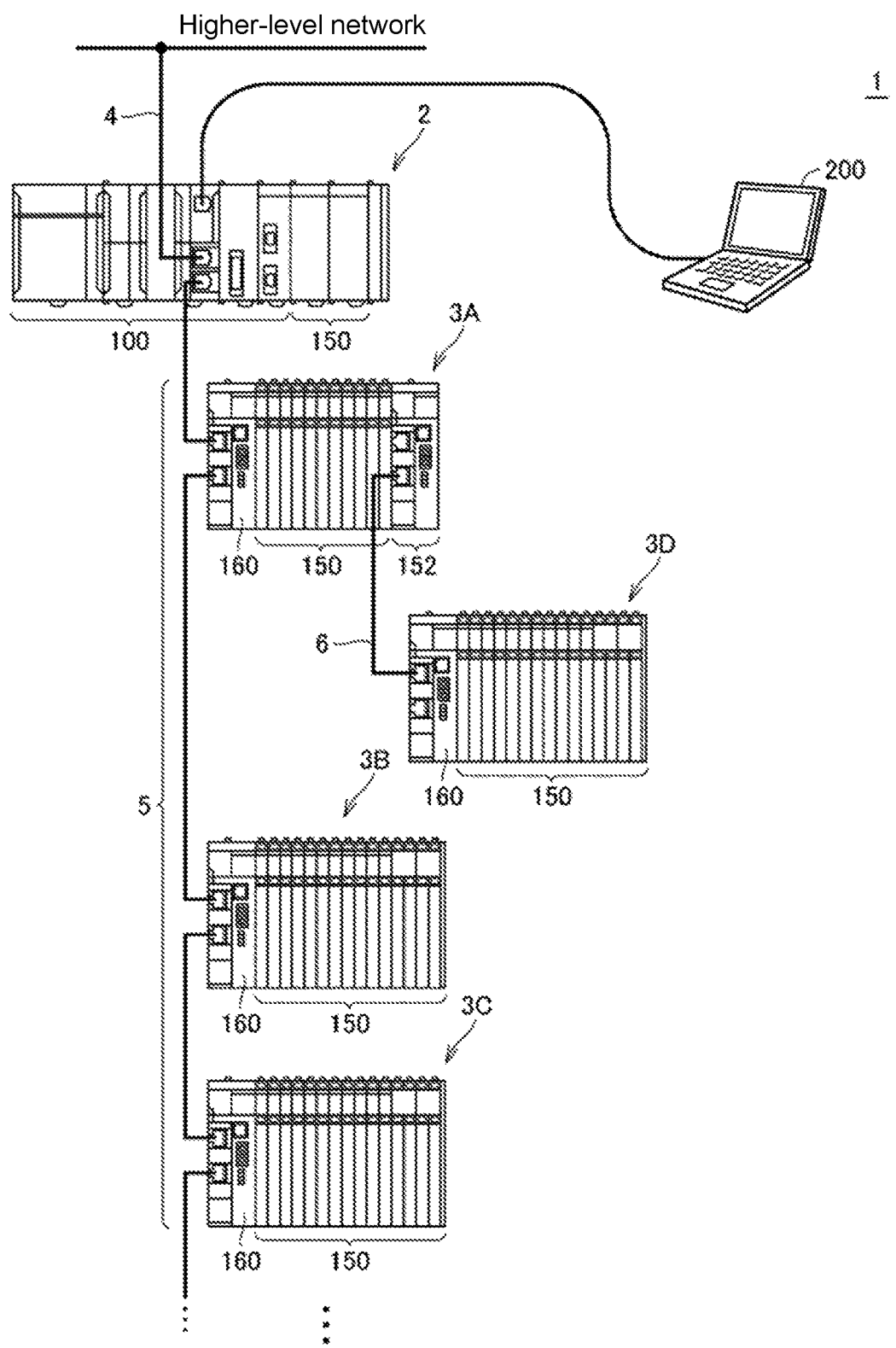
FIG. 1 is a schematic diagram showing a configuration example of a control system according to the present embodiment.

Embodiments of the present invention are explained in detail with reference to the drawings. Moreover, the same or equivalent portions in the drawings are denoted by the same reference numerals, and explanations thereof will not be repeated.

A. Configuration Example of Control System

First of all, a configuration example of a control system according to the present embodiment is explained. FIG. 1 is a schematic diagram showing a configuration example of a control system 1 according to the present embodiment. Referring to FIG. 1, the control system 1 has a plurality of networks, and includes a plurality of devices connected to any of the networks.

As an example, the control system 1 includes a programmable controller (PLC) 2 being a representative example of a control device, and remote I/O devices 3A, 3B, 3C and 3D (hereinafter also collectively referred to as "remote I/O device 3") connected to the PLC 2 via a field network. The PLC 2 may further be connected to a higher-level network 4. Other PLCs may be connected to the higher-level network 4, or any information processing device such as a gateway server or a database server may be connected to the higher-level network 4.

More specifically, the remote I/O devices 3A, 3B and 3C are connected to the PLC 2 via a field network 5. The remote I/O device 3A provides another field network 6, and the remote I/O device 3A and the remote I/O device 3D are connected via the field network 6. The field network 6 is managed by a communication unit 152 attached to the remote I/O device 3A. The PLC 2 can access the remote I/O device 3D via the field network 5 and the field network 6.

As the field networks 5 and 6, typically, a protocol is employed in which communication time between nodes in a network is guaranteed. That is, a network is configured in which a predetermined protocol is followed between communication units. For example, EtherCAT®, EtherNet/IP®, DeviceNet®, CompoNet®, or the like can be employed as such a protocol in which the communication time between nodes is guaranteed. It is not necessary that the same protocol be employed as the field network 5 and the field network 6, and protocols suitable for the respective devices or units may be employed.

Typically, the PLC 2 includes a CPU unit 100 and one or a plurality of function units 150 attached to the CPU unit 100. In addition, the remote I/O device 3 includes a coupler unit 160 having a communication function, and one or a plurality of function units 150 attached to the coupler unit 160.

The function unit 150 is a device for exchanging various information with an apparatus or a machine or the like to be controlled. The function unit 150 has one or a plurality of functions among, for example, a digital input (DI) function of receiving digital signals, a digital output (DO) function of outputting digital signals, an analog input (AI) function of receiving analog signals, and an analog output (AO) function of outputting analog signals. Alternatively, the function unit 150 includes implementation of a special function such as proportional integral derivative (PID) control or motion control.

B. Device Configuration of Each Device

Next, a device configuration of each device constituting the control system 1 is explained.

(b1: PLC 2)

The PLC 2 shown in FIG. 1 is an example of a control device, and controls a control object such as an apparatus or a machine by executing a system program and a user program. The PLC 2 typically includes the CPU unit 100 equivalent to a processing unit that executes the system program and the user program, and one or a plurality of function units 150 attached to the CPU unit 100.

Figure 2:
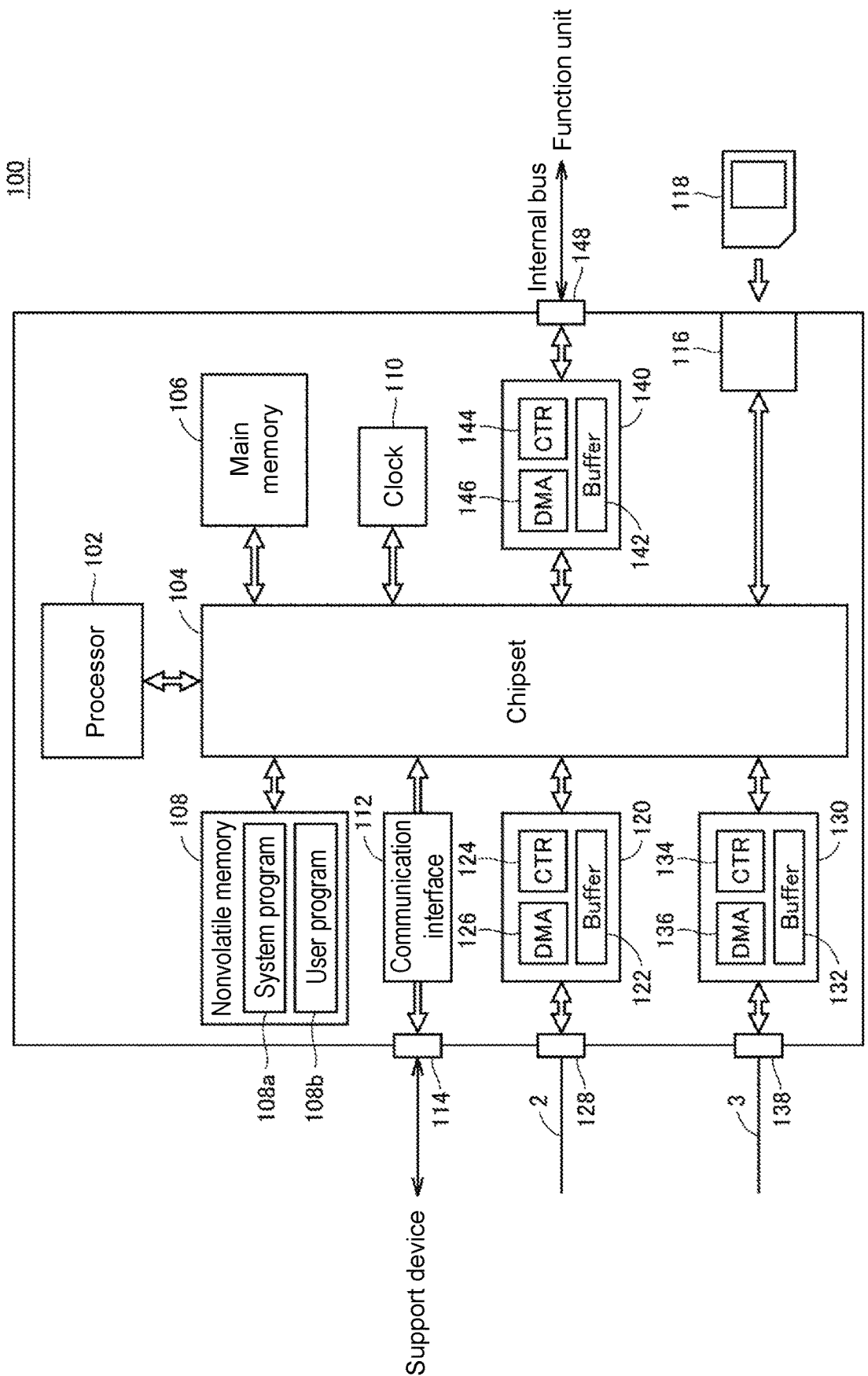
FIG. 2 is a schematic diagram showing an example of a device configuration of a CPU unit constituting a PLC of the control system according to the present embodiment.

FIG. 2 is a schematic diagram showing an example of a device configuration of the CPU unit 100 constituting the PLC 2 of the control system 1 according to the present embodiment. Referring to FIG. 2, the CPU unit 100 includes a processor 102, a chipset 104, a main memory 106, a nonvolatile memory 108, a clock 110, a communication interface 112, a memory card interface 116, network controllers 120 and 130, and an internal bus controller 140.

The processor 102, while reading a system program 108a and a user program 108b stored in the nonvolatile memory 108 and developing them in the main memory 106, sequentially executes commands included in the system program 108a and the user program 108b according to a clock supplied from the clock 110. The main memory 106 is a memory device composed of a dynamic random access memory (DRAM) or a static random access memory (SRAM) or the like and holding a user program or temporary data or the like. The nonvolatile memory 108 is composed of a flash memory or the like, and stores the system program 108a, the user program 108b and various setting information. The chipset 104 supports data exchange between the processor 102 and a peripheral device.

The communication interface 112 is a circuit for communicating with an external device such as a support device 200 or the like, and is connected to the external device via a connector 114.

A memory card 118 can be attached to the memory card interface 116, reading data from the memory card 118 and writing data to the memory card 118.

The network controllers 120 and 130 control data exchange via the field network 5. The network controllers 120 and 130 are connected to the field network 5 via connectors 128 and 138, respectively. Specifically, the network controller 120 includes a buffer memory 122, a transfer control circuit 124, and a DMA control circuit 126 realizing direct memory access (direct memory access: DMA). Similarly, the network controller 130 includes a buffer memory 132, a transfer control circuit 134 and a DMA control circuit 136. The buffer memories 122 and 132 sequentially store packets or the like transferred to the field network 5. The transfer control circuits 124 and 134 control transmission of packets onto the field network 5, reception of packets from the field network 5, and so on. The DMA control circuits 126 and 136 control access to the buffer memories 122 and 132.

The internal bus controller 140 is connected to an internal bus via a connector 148 and mediates data exchange with the function unit 150 attached to the CPU unit 100 via the internal bus. Specifically, the internal bus controller 140 includes a buffer memory 142, a transfer control circuit 144 and a DMA control circuit 146. Since each of these portions has the same function as the corresponding portions of the network controllers 120 and 130, the detailed explanation thereof will not be repeated.

The network controllers 120 and 130 and the internal bus controller 140 are equivalent to a communication interface in order to communicate with the function unit 150.

(b2: remote I/O device 3)

The remote I/O device 3 shown in FIG. 1 is a kind of relay device that can be disposed in a position away from the PLC 2, collects information indicating a state of the apparatus or machine or the like to be controlled, and so on, transfers it as input data to the PLC 2, and outputs a control output determined by an operation in the PLC 2 as a command to the apparatus or machine to be controlled. Specifically, the remote I/O device 3 includes the coupler unit 160 being an example of a communication unit transferring data between the CPU unit 100 and one or a plurality of function units 150, and one or a plurality of function units 150 attached to the coupler unit 160.

Figure 3:
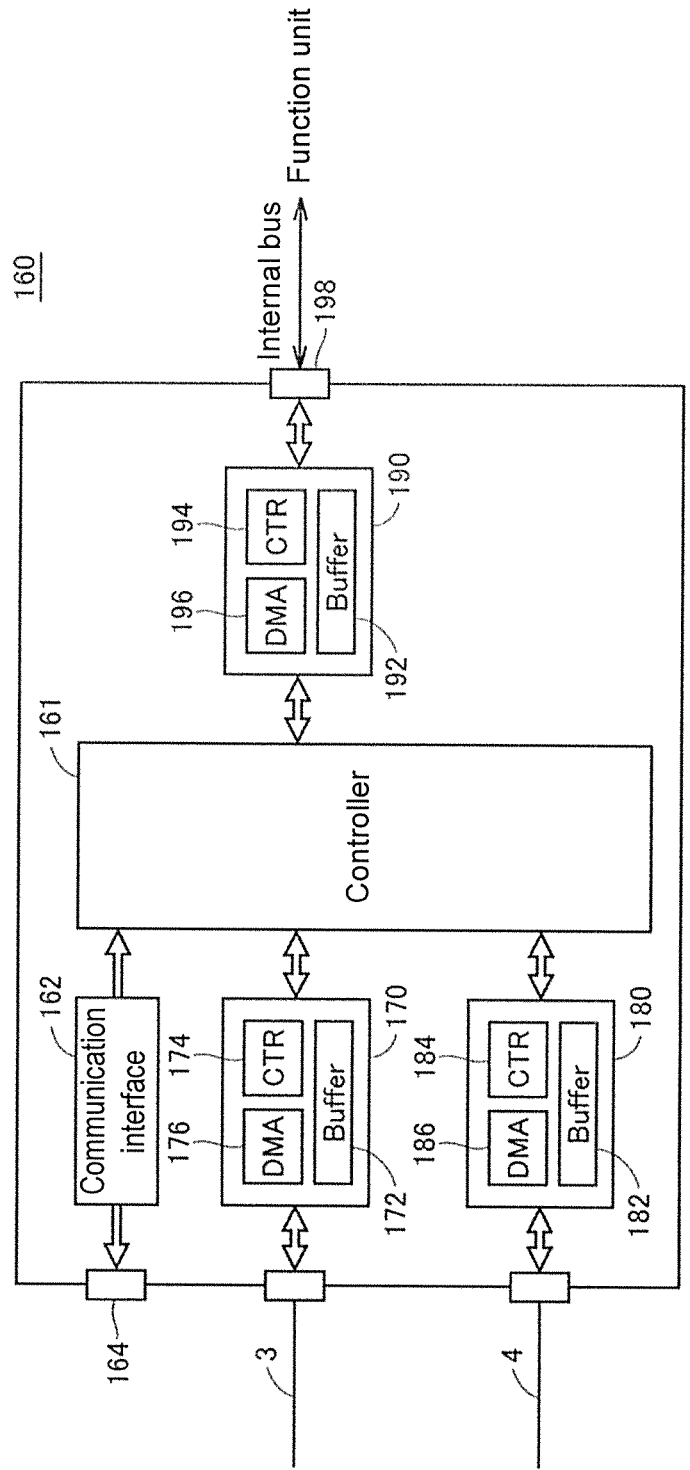
FIG. 3 is a schematic diagram showing an example of a device configuration of a coupler unit 160 constituting a remote I/O device of the control system according to the present embodiment.

FIG. 3 is a schematic diagram showing an example of a device configuration of the coupler unit 160 constituting the remote I/O device 3 of the control system 1 according to the present embodiment. Referring to FIG. 3, the coupler unit 160 includes a controller 161, a communication interface 162, a memory card interface (not shown in FIG. 3), network controllers 170 and 180, and an internal bus controller 190.

The controller 161 is a circuit in charge of processing in the remote I/O device 3, and is typically realized using a hardwired processing circuit such as an application specific integrated circuit (ASIC) or a field-programmable gate array (FPGA) or the like. However, all or some of its functions may be implemented by software (realized by a processor executing a program).

Like the communication interface 112 shown in FIG. 2, the communication interface 162 is a circuit for communicating with an external device such as the support device 200 or the like, and is connected to the external device via a connector 164.

The network controllers 170 and 180 control the data exchange via the field network 5. More specifically, the network controller 170 includes a buffer memory 172, a transfer control circuit 174 and a DMA control circuit 176. Similarly, the network controller 180 includes a buffer memory 182, a transfer control circuit 184 and a DMA control circuit 186. Since the network controllers 170 and 180 have the same function as the network controllers 120 and 130 shown in FIG. 2, the detailed explanation thereof will not be repeated.

The internal bus controller 190 is connected to an internal bus via a connector 198 and mediates data exchange with the function unit 150 attached to the coupler unit 160 via the internal bus. Specifically, the internal bus controller 190 includes a buffer memory 192, a transfer control circuit 194 and a DMA control circuit 196. Since each of these portions has the same function as the corresponding portions of the internal bus controller 140 shown in FIG. 2, the detailed explanation thereof will not be repeated.

(b3: support device 200)

As shown in FIG. 1, the support device 200 can be connected to the PLC 2 or the remote I/O device 3. The support device 200 provides a function of checking data or a state value held by the PLC 2 and the remote I/O device 3 that constitute the control system 1, or functions of developing and debugging a program to be executed by the PLC 2, and so on. The support device 200 is typically realized by executing a support program on a personal computer having a generic architecture.

Figure 4:
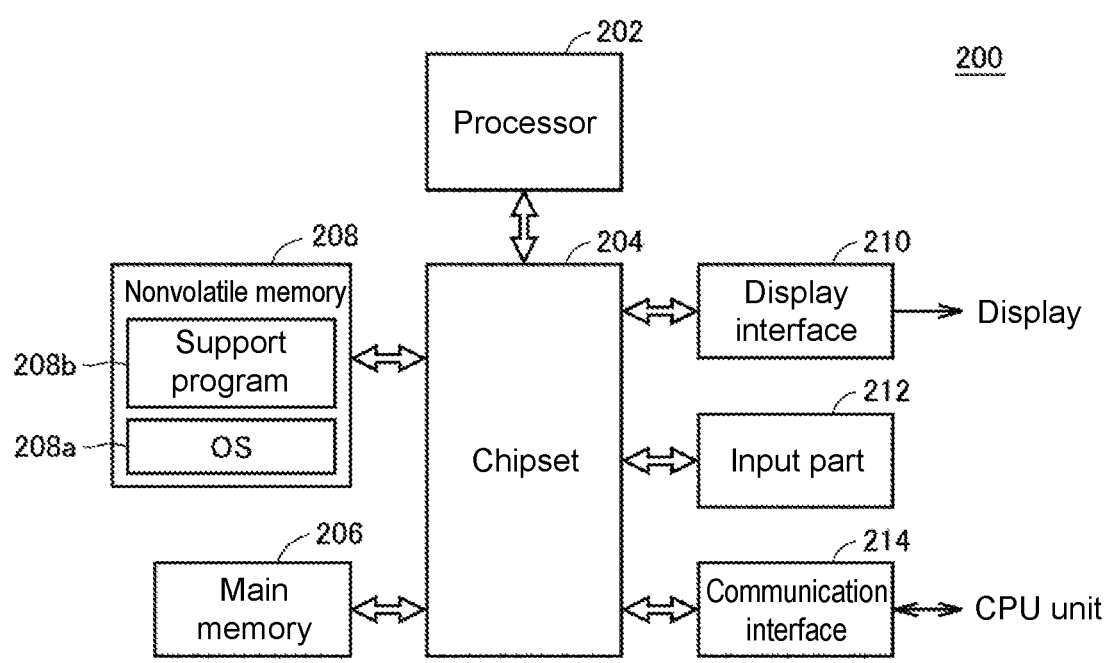
FIG. 4 is a schematic diagram showing an example of a device configuration of a support device of the control system according to the present embodiment.

FIG. 4 is a schematic diagram showing an example of a device configuration of the support device 200 of the control system 1 according to the present embodiment. Referring to FIG. 4, the support device 200 includes a processor 202, a chipset 204, a main memory 206, a nonvolatile memory 208, a display interface 210, an input part 212, and a communication interface 214.

The processor 202, while reading an operating system (OS) 208a and a support program 208b stored in the nonvolatile memory 208 and developing them in the main memory 206, sequentially executes commands included in the OS 208a and the support program 208b. The main memory 206 is a memory device composed of a DRAM or a SRAM or the like and holding a user program or temporary data or the like. The nonvolatile memory 208 is composed of a flash memory or the like, and stores the OS 208a, the support program 208b and various setting information. The chipset 204 supports data exchange between the processor 202 and a peripheral device.

The display interface 210 outputs, to a display, a result of an operation performed by the processor 202 or the like. The input part 212 includes a keyboard or a memory or the like, and receives a user operation. The communication interface 214 is a circuit for communicating with the PLC 2 (CPU unit 100).

C. Overview

Next, an overview is given of functions provided in the control system 1 according to the present embodiment.

Figure 5:
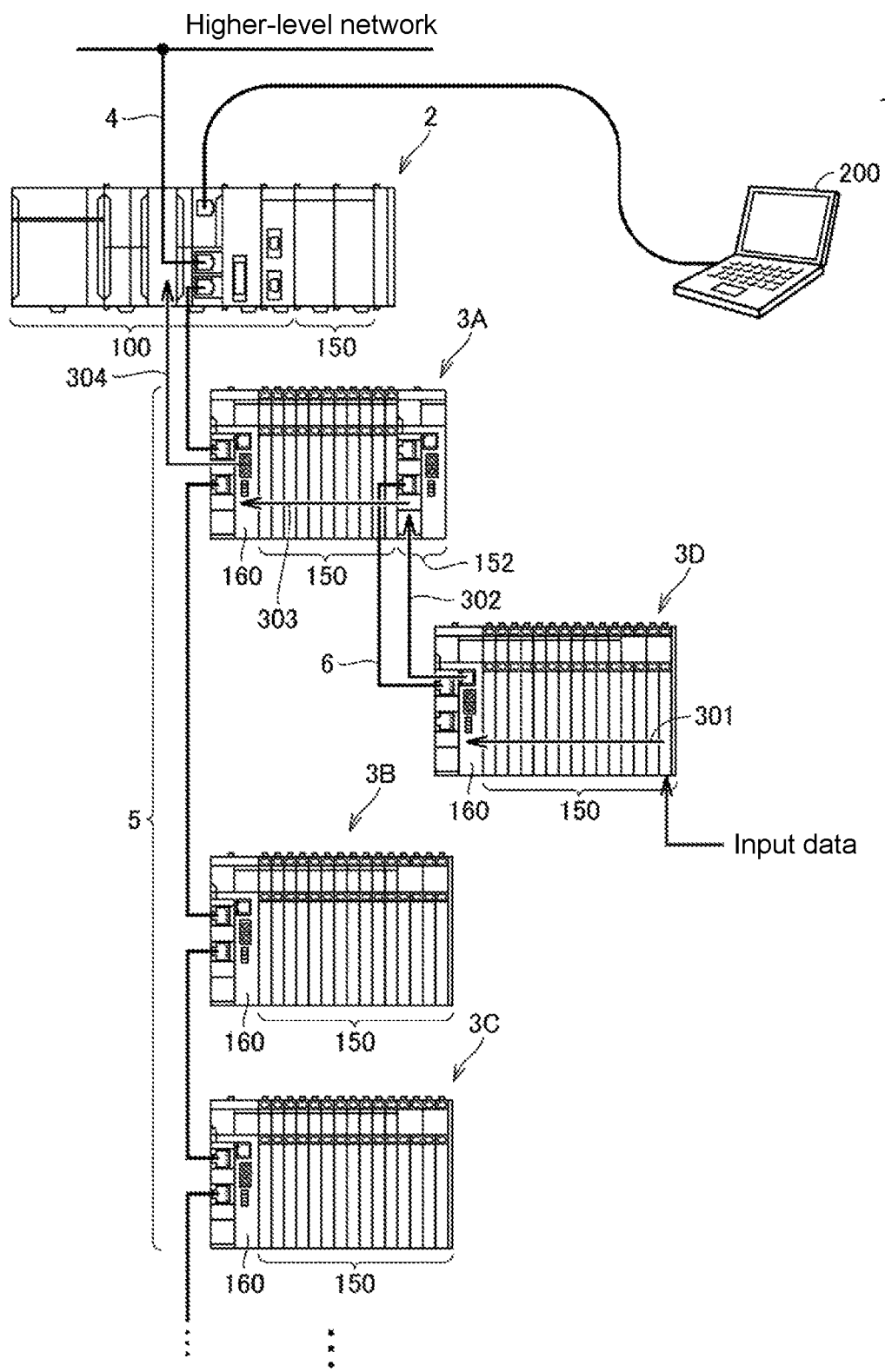
FIG. 5 is a diagram showing an example of a state of collecting input data via the remote I/O device of the control system according to the present embodiment.
Figure 6A:
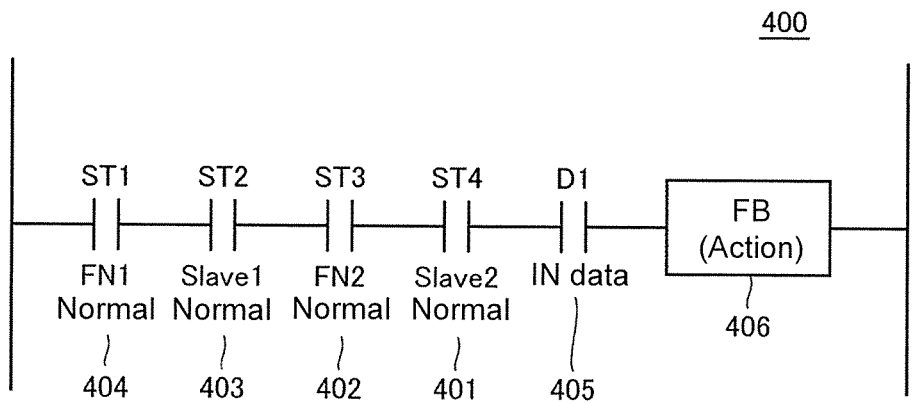
FIG. 6(A), FIG. 6(B) and FIG. 6(C) are diagrams showing an example of a user program using the input data shown in FIG. 5.
Figure 6B:
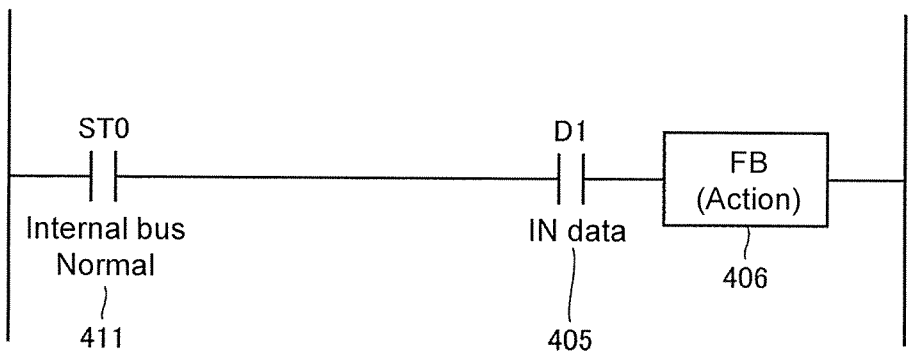
Figure 6C:
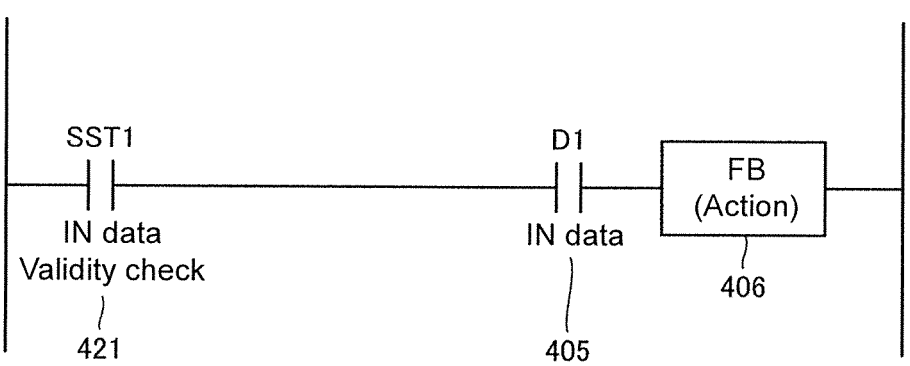

FIG. 5 is a diagram showing an example of a state of collecting input data via the remote I/O device 3 of the control system 1 according to the present embodiment. FIG. 6(A), FIG. 6(B) and FIG. 6(C) are diagrams showing an example of a user program using the input data shown in FIG. 5.

As shown in FIG. 5, as an example, considered is a case of collecting input data (also referred to as "IN data" in the drawings) from a field via one function unit 150 attached to the remote I/O device 3D included in the control system 1. Moreover, in the CPU unit 100, any data held by the function unit 150 can be used. Although the input data is explained as a representative example in the following, the invention is not limited thereto.

In the example shown in FIG. 5, the input data collected by the function unit 150 is transferred successively through a path taking an internal bus of the remote I/O device 3D (transmission path 301), the field network 6 and the communication unit 152 (transmission path 302), an internal bus of the remote I/O device 3A (transmission path 303) and the field network 5 (transmission path 304). These units and buses function as at least part of the communication unit transferring data between the CPU unit 100 and one or a plurality of function units 150.

In general, it is necessary to make sure in advance on a user program that a value collected as the input data in the CPU unit 100 reflects a value of an input signal actually input to the function unit 150. The reason is that, for example, when the input data indicates "False," it cannot be determined whether it reflects that the input signal input to the corresponding function unit 150 is actually "False," or whether the input data incorrectly becomes "False" in the CPU unit 100 even though the input signal is "True," because there is something abnormal in the process of sequentially transferring the input data through a transmission path and the transmission fails.

Therefore, in general, when describing a command to execute some processing (action) using the input data, it is common to add a condition indicating that a collection path (transmission path) of the input data is sound. Information that constitutes such a condition is also referred to as "validity check data" in the following. In addition, in the present embodiment, since a user program is basically created by variable programming, a variable for referring to a value of the "validity check data" is also referred to as a "validity check variable."

A user program 400 shown in FIG. 6(A) shows an example in which execution/stop of some action is associated with a value of the input data. That is, a function block 406 corresponding to the action is activated under condition of an input value flag 405 indicating the value of the input data.

Furthermore, in a previous stage of the input value flag 405, state flags 401 to 404 (variable names ST1 to ST4) are disposed in series. The state flags 401 to 404 are respectively equivalent to the validity check variables of the transmission paths 301 to 304 shown in FIG. 5. That is, the state flag 401 indicates validity (or soundness or status) of the remote I/O device 3D, the state flag 402 indicates validity of the field network 6, the state flag 403 indicates validity of the remote I/O device 3A, and the state flag 404 indicates validity of the field network 5.

On the other hand, a user program 410 shown in FIG. 6(B) shows an example in which the input data is captured from a function unit attached to the CPU unit 100. Also in this example, the function block 406 corresponding to the action is activated under condition of the input value flag 405 indicating the value of the input data. Then, a state flag 411 is disposed as a condition in the previous stage of the input value flag 405 indicating the input data. The state flag 411 indicates validity (or soundness or status) of an internal bus of the CPU unit 100.

As can be seen by comparing FIG. 6(A) with FIG. 6(B), as the number of network levels constituting a path through which target input data is transmitted to the CPU unit 100 increases, more flags will need to be set as the validity check data.

As networking of a control system becomes more advanced, it is necessary to confirm what is defined by each flag, and, if a network configuration is changed, a flag to be used as the validity check data must be changed accordingly to update the user program 410.

With respect to such a problem, in the control system 1 according to the present embodiment, an environment is provided in which special validity check data that summarizes conditions necessary to evaluate the validity of a target input variable can be used.

FIG. 6(C) shows a user program 420 as an example using the validity check data provided in the control system 1 according to the present embodiment. More specifically, in the user program 420, the function block 406 corresponding to the action is activated under condition of the input value flag 405 indicating the value of the input data. Then, a special flag 421 indicating the corresponding validity check data is disposed as a condition in the previous stage of the input value flag 405 indicating the input data. In this example, the special flag 421 is a set (logical AND) of device variables indicating a state of a device present on a path from a function unit that has captured the input data to the CPU unit 100.

In the present embodiment, the following function is implemented. When a variable (validity check variable) associated with any data held by the function unit 150 and indicating validity of the data is designated in a user program, a result of aggregation of states (values of each state flag) of each of the communication units present on the transmission path from the function unit 150 holding designated data to the CPU unit 100 is reflected as a value (validity check data) indicated by the variable.

Since such special validity check data can be used, a developer of the user program can use an abstracted validity check variable that can absorb differences in hardware configuration and network configuration between the input data input to a function unit connected to the CPU unit 100 via an internal bus and the input data input to a function unit connected via one or a plurality of networks. Thus, programming creation efficiency can be improved and a change in the network configuration or the like can be flexibly responded to.

In the following, several implementation methods for providing the validity check data according to the present embodiment are explained.

D. First Implementation Method

As a first implementation method, a method is explained in which the validity check data is provided using only the functions installed on the support device 200. In the first implementation method, a function of reflecting a validity check variable in a user program as the corresponding validity check data is realized by the support device 200.

Figure 7:
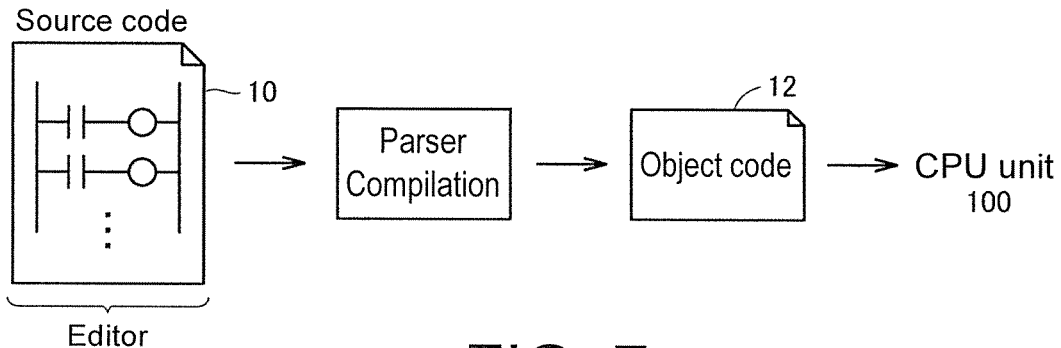
FIG. 7 is a schematic diagram for explaining a function concerning creation of a user program in the support device of the control system according to the present embodiment.

FIG. 7 is a schematic diagram for explaining a function concerning creation of a user program in the support device 200 of the control system 1 according to the present embodiment. Referring to FIG. 7, a user creates a source code 10 of a user program using an editor provided by the support device 200. In response to a user operation, the support device 200 subjects the source code 10 of the user program to parsing (syntactic analysis) and compilation and generates an object code 12. The object code 12 of the user program is transferred to the CPU unit 100 of the PLC 2. The transferred one or more object codes 12 are stored as the user program 108b (FIG. 2) in the CPU unit 100 and executed.

When the source code 10 of the user program is parsed and compiled, if there is a description using the validity check data according to the present embodiment, processing of the user program using the validity check data may be realized by decomposing the content intended by the validity check data into a combination of existing commands. By employing a method that the support device 200 parses validity check data or a validity check variable included in the source code 10 of the user program and creates an appropriate object code 12, the user can use the validity check data without particular awareness during compilation and so on.

Figure 8A:
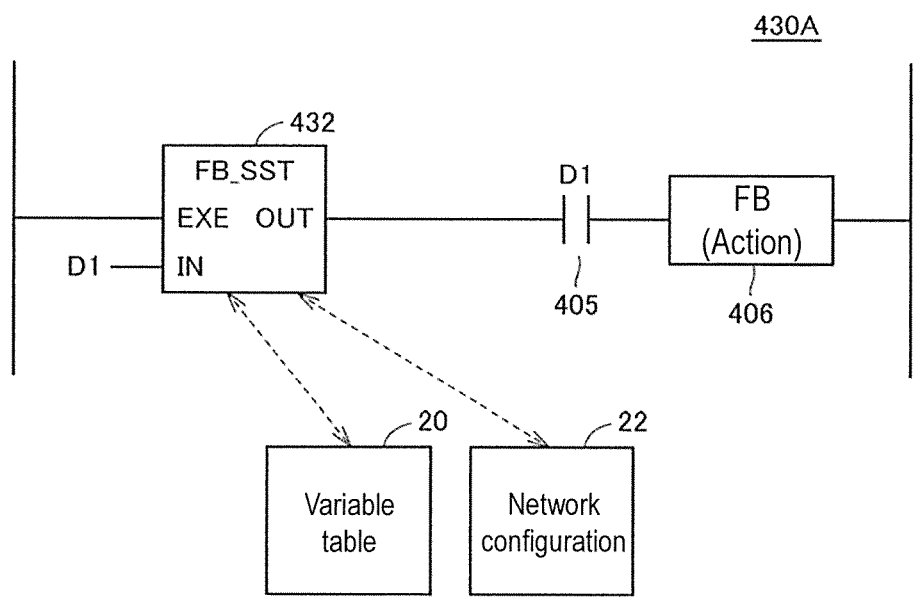
FIG. 8(A) and FIG. 8(B) are schematic diagrams for explaining a first implementation method for providing validity check data in the control system according to the present embodiment.
Figure 8B:
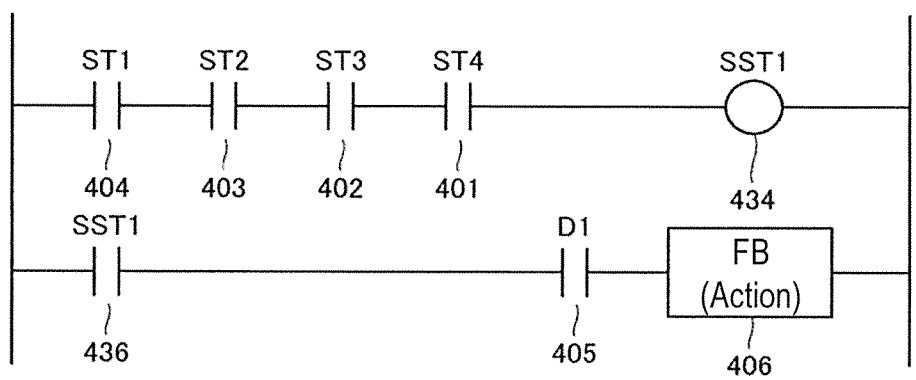

FIG. 8(A) and FIG. 8(B) are schematic diagrams for explaining the first implementation method for providing validity check data in the control system 1 according to the present embodiment. For example, it is assumed that a user program 430A as shown in FIG. 8(A) is created. In the user program 430A, the function block 406 corresponding to the action is activated under condition of the input value flag 405 indicating the value of the input data. A function block 432 is used to define the validity check data on the input value flag 405. The function block 432 means a command for constructing the validity check data according to the present embodiment.

More specifically, the function block 432 defines that, when an input (EXE) is activated, a value indicating a result of a logical operation (typically, logical AND) on a set of necessary flags is output (OUT) with reference to a transmission path of a variable (variable D1 in the example shown in FIG. 8(A) and FIG. 8(B)) defined as the input data (IN) and so on.

More specifically, when a source code of the user program 430A as exemplified in FIG. 8(A) is parsed, in the function block 432 included therein, a set of device variables corresponding to a transmission path of a designated variable is specified with reference to a variable table 20 and a network configuration 22 that are predefined and so on.

The variable table 20 associates variables available to a user program with actual function unit port numbers, and defines assignment of any variable name to a value collected at a certain port of a certain function unit. The network configuration 22 defines a connection relationship (network topology) between the CPU unit 100 and each function unit 150 in the control system 1, and so on.

Typically, by referring to the variable table 20 and the network configuration 22, a flag necessary to determine the output value of the function block 432 can be specified. The support device 200 analyzes the source code 10 of the user program in which the validity check variable is designated, and specifies one or a plurality of communication units related to determination of a value (validity check data) indicated by the validity check variable.

When such a flag necessary to determine the output value of the function block 432 is specified, a user program 430B as shown in FIG. 8(B) is generated. That is, the support device 200, after adding to the source code a command for determining the value indicated by the validity check variable from a set of values indicating the state (status) of the specified one or plurality of communication units (the user program 430B), generates an object code of the user program.

More specifically, in the user program 430B, a special coil 434 corresponding to the function block 432 of the user program 430A is introduced, and the special coil 434 stores a result of a set (logical AND) of the state flags 401 to 404. Then, the user program 430A as exemplified in FIG. 8(A) is replaced with a special flag 436 indicating a value stored in the special coil 434. Finally, by compiling the user program 430B as shown in FIG. 8(B), the function of the validity check data according to the present embodiment is realized.

Moreover, the user program 430B may be generated internally and does not need to be displayed in a form visible to the user.

According to the first implementation method, when a user program including the function block 432 is parsed, the content meant by the special flag 436 corresponding to the function block 432 is dynamically determined with reference to the content of the variable table 20 and the network configuration 22. By employing such processing of dynamically determining the content of the validity check data, the user can use a validity check variable to be an execution condition without worrying about which function unit each variable is associated with and which network the function unit associated with the variable is present on.

A function of logging an execution state of a user program in the CPU unit 100 is sometimes implemented in the support device 200. In such a logging function, while the user program 430A shown in FIG. 8(A) is displayed, a value indicated by the special flag 436 shown in FIG. 8(B) may be displayed as a value of the function block 432. By using such a logging function, the user can confirm whether or not the input value flag 405 is effectively input without awareness of details of the content meant by the special flag 436.

Even in the case where the input data is captured from the function unit attached to the CPU unit 100, as shown in FIG. 6(B), the function block 432 as described above functions. If the input data is captured from the function unit attached to the CPU unit 100, in the variable table 20, for example, since the function unit from which the input data is captured is designated, the special coil 434 is associated with a state flag indicating the soundness (status) of the internal bus of the CPU unit 100.

Figure 9:
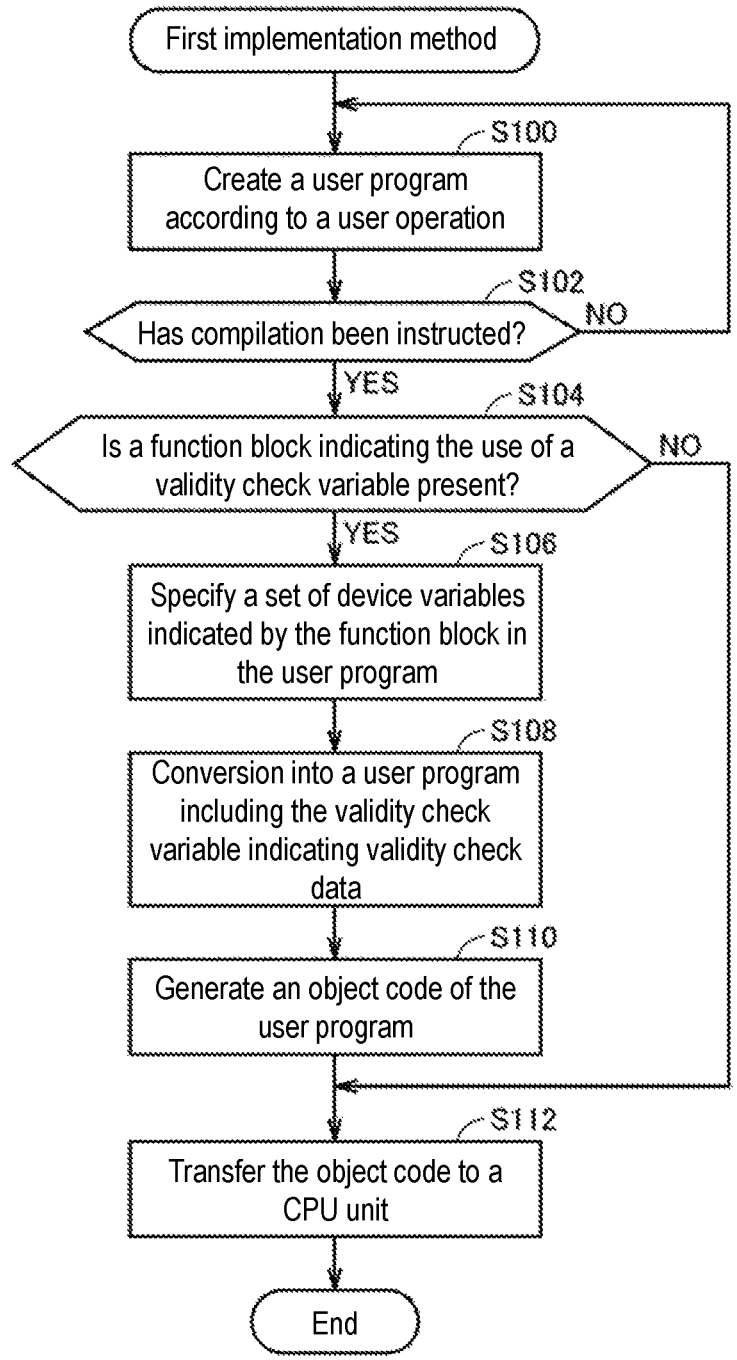
FIG. 9 is a flowchart showing a processing procedure according to the first implementation method for providing validity check data in the control system according to the present embodiment.

Next, a processing procedure according to the first implementation method is explained. FIG. 9 is a flowchart showing a processing procedure according to the first implementation method for providing validity check data in the control system 1 according to the present embodiment. Typically, each step shown in FIG. 9 is performed by the processor 202 of the support device 200 executing the support program 208*b* (see FIG. 4) being an example of a control program.

Referring to FIG. 9, according to a user operation, the support device 200 creates a user program (step S100). The step S100 is realized by the editor function provided by the support device 200. Subsequently, the support device 200 determines whether or not compilation has been instructed (step S102). If compilation has not been instructed (NO in step S102), the processing in and after step S100 is repeated.

When compilation is instructed (YES in step S102), the support device 200 analyzes a source code of the user program and determines whether or not a function block indicating the use of a validity check variable is present (step S104). If the function block indicating the use of the validity check variable is not present (NO in step S104), processing in steps S106 to S110 is skipped.

If the function block indicating the use of the validity check variable is present (YES in step S104), the support device 200 specifies a set of device variables indicated by a function block in the user program, with reference to a variable table and a network configuration or the like. That is, when a variable (validity check variable) associated with any data held by the function unit 150 and indicating validity of the data is designated in the user program, the support device 200 specifies a transmission path from the function unit 150 holding designated data to the CPU unit 100 and communication units present on the specified transmission path.

Then, the support device 200 converts the user program into a user program including the validity check variable indicating validity check data composed of the specified set of device variables (step S108). Accordingly, the support device 200 reflects a result of aggregation of states of each of the specified communication units as a value (validity check data) indicated by the validity check variable.

The support device 200 compiles the user program converted in step S108 or the user program created in step S100 and generates an object code of the user program (step S110). Then, the support device 200 transfers the generated object code of the user program to the CPU unit 100 (step S112). Then, the processing of creation and compilation of the user program is ended.

In the above explanation, an implementation is exemplified in which the target validity check data can be dynamically determined by using the function block indicating the validity check variable. However, the present invention is not limited thereto, and a validity check variable may be prepared in advance for all the input value flags (input value variables) that can be handled by the CPU unit 100. For example, with respect to an input value variable "d0001," by using a combination of an identification number assigned to each variable and a character string indicating the type of the variable as a variable name, like a validity check variable "sst0001," such a one-to-one association becomes possible. Alternatively, each variable may be regarded as an object, and its property or method or the like may be used to designate or use each validity check variable.

Whichever method is used, it is a different manner of expression in programming and can be implemented in the same manner as described above.

As described above, in the first implementation method, the content of the function block that is defined as the validity check variable is analyzed, and the validity check data is interpreted as a combination of necessary state flags. Then, a value of the validity check data is determined in each control cycle with reference to the values of the state flags and so on stored in the CPU unit 100. By employing such a method, since there is no need to prepare a region on the CPU unit 100 for holding the validity check data, efficient programming can be realized even in a multistage or highly networked control system while a situation is avoided where memory resources of the CPU unit 100 are lacking.

E. Second Implementation Method

As a second implementation method, a method is explained in which the functions installed on the CPU unit 100 of the PLC 2 and the support device 200 cooperate to provide the validity check data.

Figure 10:
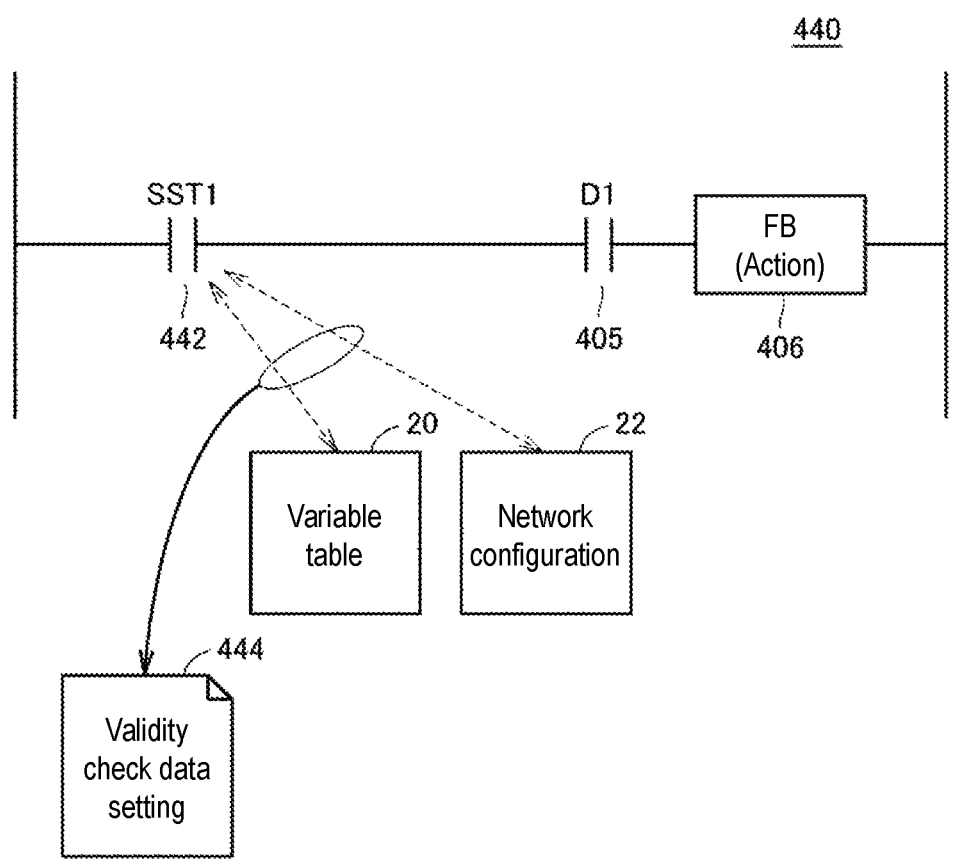
FIG. 10 is a schematic diagram for explaining processing relating to a second implementation method in the support device of the control system according to the present embodiment.

FIG. 10 is a schematic diagram for explaining processing relating to the second implementation method in the support device 200 of the control system 1 according to the present embodiment. Referring to FIG. 10, it is assumed that the user has created a user program 440 using the editor provided by the support device 200. Here, it is assumed that a validity check variable SST1 (special flag 442) is assigned to the input value flag 405 (variable D1).

When a source code of the user program 440 as exemplified in FIG. 10 is parsed, the validity check variable SST1 defined therein is analyzed as a set of device variables corresponding to a transmission path of the corresponding input value flag 405 (variable D1) with reference to the variable table 20 and the network configuration 22 that are predefined and so on.

The variable table 20 associates variables available to a user program with actual function unit port numbers, and defines assignment of any variable name to a value collected at a certain port of a certain function unit. The network configuration 22 defines the connection relationship (network topology) between the CPU unit 100 and each function unit 150 in the control system 1, and so on.

Typically, by referring to the variable table 20 and the network configuration 22, the status information necessary to determine an output value of the validity check variable (special flag 442) can be specified. When a flag necessary to determine the output value of the validity check variable is specified, validity check data setting 444 for realizing the target special flag 442 is generated. The validity check data setting 444 is setting information for providing the validity check data designated in the CPU unit 100.

Figure 11A:
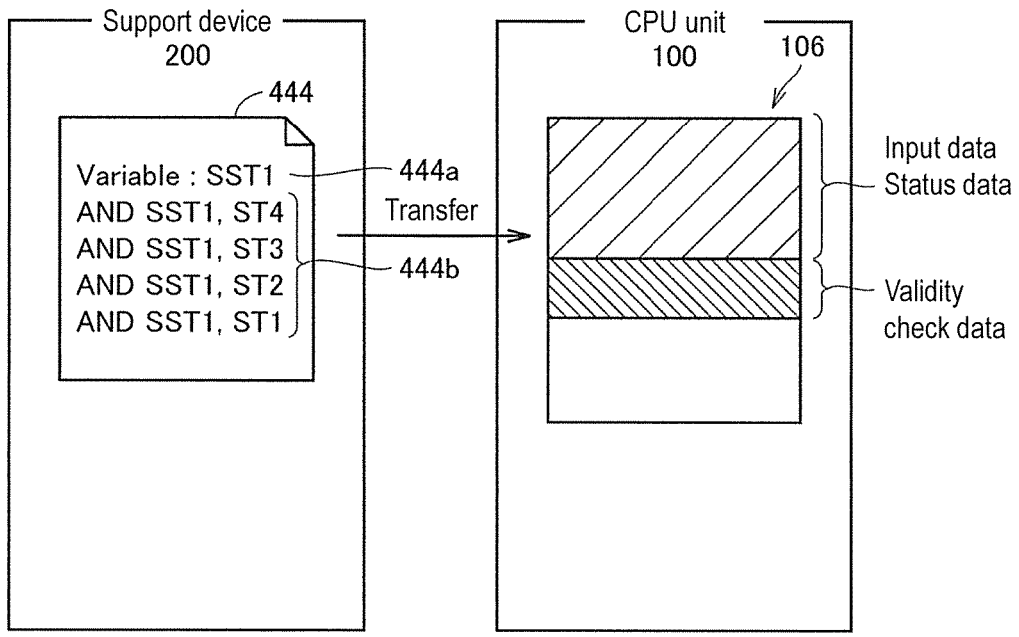
FIG. 11(A) and FIG. 11(B) are schematic diagrams for explaining processing relating to the second implementation method in the control system according to the present embodiment.
Figure 11B:
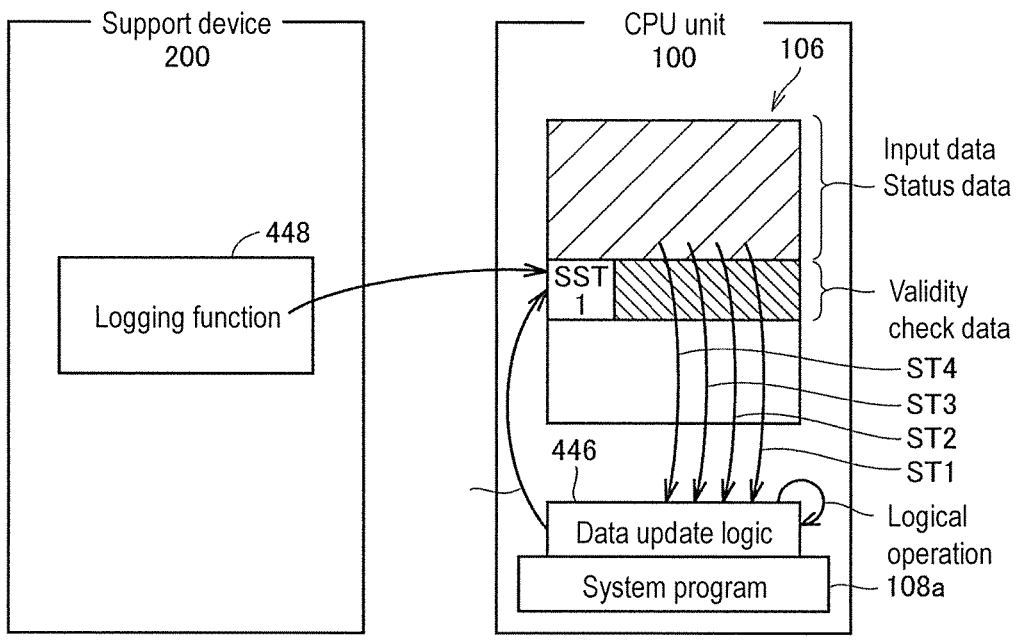

FIG. 11(A) and FIG. 11(B) are schematic diagrams for explaining processing relating to the second implementation method in the control system 1 according to the present embodiment. As shown in FIG. 11(A), the validity check data setting 444 generated in accordance with the processing as shown in FIG. 10 includes a definition 444*a* that the validity check variable is SST1, and a definition 444*b* of the status information constituting the validity check variable.

In the definition 444b, for example, variable names indicating state flags to be ANDed are described. In this way, the support device 200 analyzes the source code of the user program in which the validity check variable is designated, and specifies one or a plurality of communication units related to determination of a value (validity check data) indicated by the validity check variable.

In the CPU unit 100, input/output data and status data are disposed on the main memory 106, and their respective values are subjected to input/output refresh (update) every control cycle.

The validity check data setting 444 is transferred from the support device 200 to the CPU unit 100. In this way, the support device 200 connected to the CPU unit 100 performs analysis of the source code of the user program and transmits information (validity check data setting 444) specified by the analysis to the CPU unit 100.

The CPU unit 100 interprets the validity check data setting 444 received from the support device 200, and secures a region for storing the validity check data in a predetermined region on the main memory 106. In this secured region, the validity check data of a variable name designated in the validity check data setting 444 may be stored.

Furthermore, as shown in FIG. 11(B), in the CPU unit 100, in accordance with the definition 444b of the state flags included in the validity check data setting 444, a data update logic 446 for updating the validity check data is formed. The data update logic 446 is typically executed on the system program 108a, refers to a target state value (value referred to as variables ST1 to ST4) in accordance with the definition 444b of the state flags, and writes to a designated region a result of a logical operation (logical AND in this example) on the refereed state value. It is preferable that the writing (update) of the validity check data be repeated in a control cycle substantially the same as the input/output refresh.

In this way, the CPU unit 100 adds a function of updating and holding the validity check data indicated by the validity check variable based on the validity check data setting 444 including specified information.

Since the validity check data (variable SST1 in this example) designated on the user program has been prepared on the CPU unit 100, a logging function 448 implemented in the support device 200 presents a state value at each timing to the user with reference to the designated validity check variable.

According to the second implementation method, the support device 200 and the CPU unit 100 of the PLC 2 cooperate to provide the validity check data. That is, the CPU unit 100 collects from the support device 200 the validity check data setting 444 including (1) the variable name of the validity check variable, and (2) the definition of the state value indicating the validity check variable and the logical operation. Then, the CPU unit 100 holds and updates the validity check data in accordance with the collected validity check data setting 444.

According to the second implementation method, since the CPU unit 100 will hold and update the validity check data, the validity check data can be referred to from any external device that is not limited to the support device 200 that created the user program 440, and versatility can further be enhanced. Also, since the validity check data is updated in the CPU unit 100, the validity check data can be updated in the same control cycle as the input/output data, and the validity check data can also be used for another sequence program.

Figure 12:
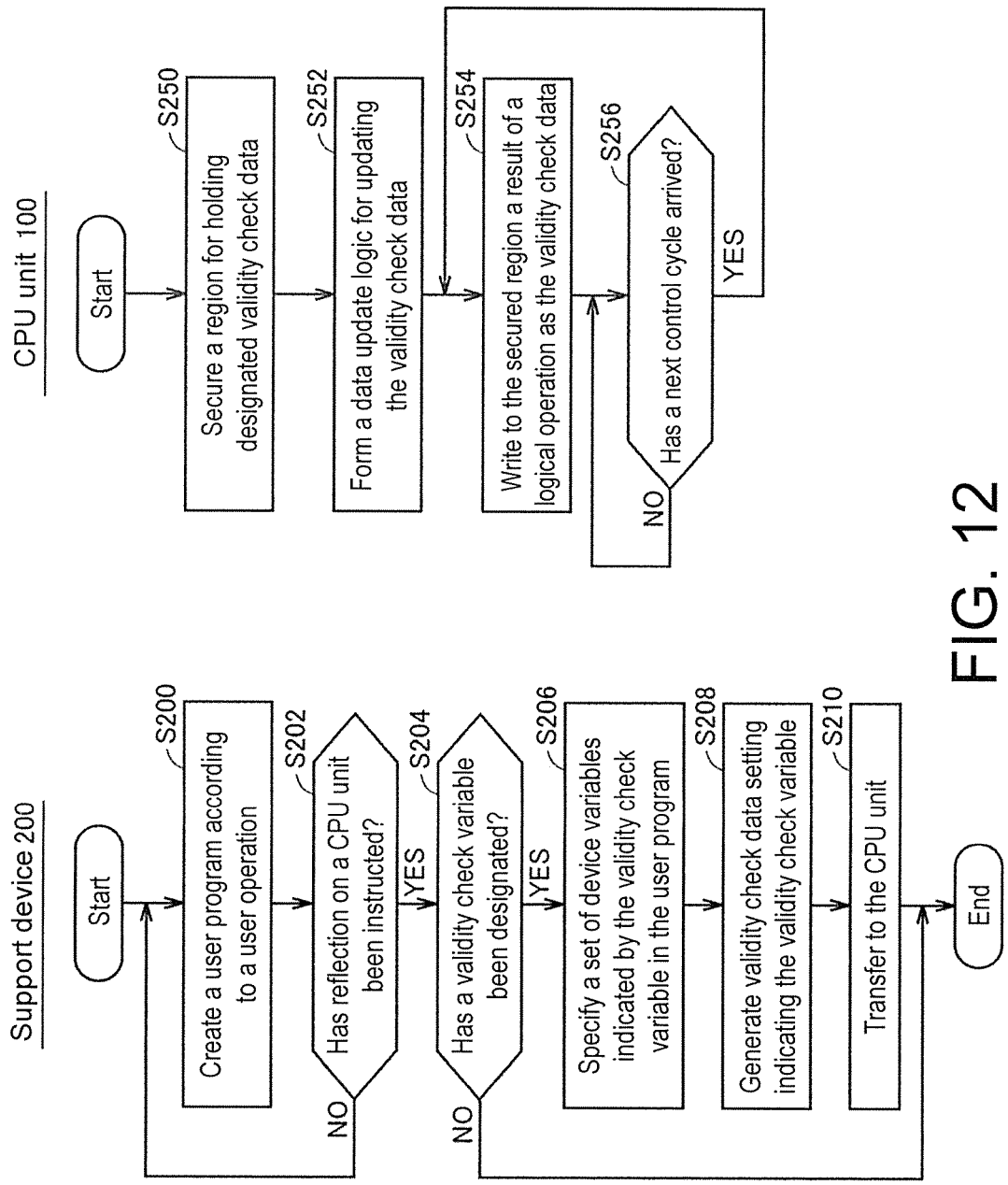
FIG. 12 is a flowchart showing a processing procedure according to the second implementation method for providing validity check data in the control system according to the present embodiment.

Next, a processing procedure according to the second implementation method is explained. FIG. 12 is a flowchart showing a processing procedure according to the second implementation method for providing validity check data in the control system 1 according to the present embodiment. The processing procedure shown in FIG. 12 is realized by the cooperation between the support device 200 and the CPU unit 100 of the PLC 2, wherein each step of the support device 200 is performed by the processor 202 of the support device 200 executing the support program 208b (see FIG. 4), and each step of the CPU unit 100 is performed by the processor 102 executing the system program 108a (see FIG. 2).

Referring to FIG. 12, according to a user operation, the support device 200 creates a user program (step S200). The step S200 is realized by the editor function provided by the support device 200. Subsequently, the support device 200 determines whether or not reflection on the CPU unit 100 has been instructed (step S202). If the reflection on the CPU unit 100 has not been instructed (NO in step S202), the processing in and after step S200 is repeated.

When the reflection on the CPU unit 100 is instructed (YES in step S202), the support device 200 analyzes a source code of the user program and determines whether or not a validity check variable has been designated (step S204). If the validity check variable has not been designated (NO in step S204), the processing in steps S206 to S210 is skipped.

If the validity check variable has been designated (YES in step S204), the support device 200 specifies a set of device variables indicated by the validity check variable in the user program with reference to a variable table and a network configuration and so on (step S206), generates the validity check data setting 444 indicating the validity check variable (step S208), and transfers it to the CPU unit 100 (step S210).

According to the validity check data setting 444 from the support device 200, the CPU unit 100 secures a region on the main memory 106 for holding the designated validity check data (step S250) and forms a data update logic for updating the validity check data (step S252). Then, the CPU unit 100 refers to a designated state value, and writes to the secured region, as the validity check data, a result of a logical operation on the referred state value (step S254). The CPU unit 100 determines whether or not a next control cycle has arrived (step S256), and if the next control cycle has arrived (YES in step S256), repeats the processing in step S254.

By accessing the CPU unit 100 at any timing and designating the validity check variable, the support device 200 or other external device is capable of acquiring a value of the corresponding validity check data.

In the above explanation, an example is shown in which the validity check variable is used in the user program. However, a function block may instead be used, as exemplified in the first implementation method described above. If a function block is used, the CPU unit 100 may automatically assign a variable name corresponding to the designated function block. Alternatively, each variable may be regarded as an object, and its property or method or the like may be used to designate or use each validity check variable.

Whichever method is used, it is a different manner of expression in programming and can be implemented in the same manner as described above.

As described above, in the second implementation method, since the validity check data is held inside the CPU unit 100 based on the validity check data setting 444 generated from the information of the user program created in the support device 200, the validity check data can be accessed from any external device. Hence, applicability of the validity check data can be enhanced. In addition, since the validity check data held inside the CPU unit 100 is updated in the same control cycle as normal input/output data and state values, it can also be commonly used among a plurality of abnormality processing logics.

F. Third Implementation Method

As a third implementation method, a method is explained in which the validity check data is provided using substantially only the functions installed on the CPU unit 100 of the PLC 2.

Figure 13:
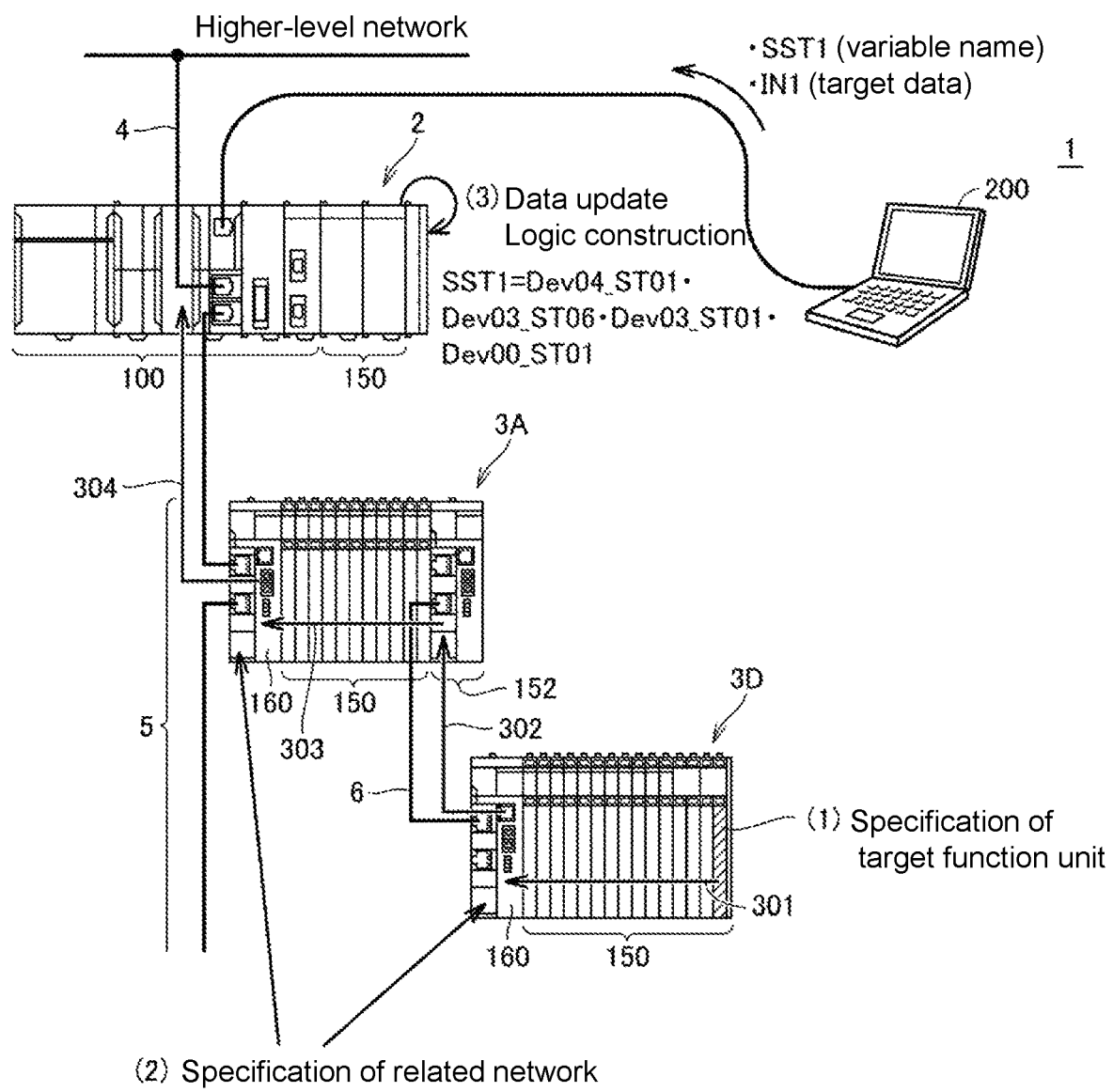
FIG. 13 is a schematic diagram for explaining a third implementation method for providing validity check data in the control system according to the present embodiment.

FIG. 13 is a schematic diagram for explaining the third implementation method for providing validity check data in the control system 1 according to the present embodiment. Referring to FIG. 13, in the third implementation method, the support device 200 transmits to the CPU unit 100 the validity check variable (variable SST1 in this example) used for referring to the validity check data, and specification (validity check variable IN1 in this example) of the input data used to determine the validity check data.

The CPU unit 100 specifies a device variable corresponding to target input data designated from the support device 200, and specifies a target function unit from an address of the specified device variable ((1) in FIG. 13). Subsequently, the CPU unit 100 determines which network the specified function unit belongs to, and specifies the network related to the target function unit ((2) in FIG. 13). Then, based on a network address and a state value address of the function unit managing the specified network and so on, state values necessary to calculate the validity check data are specified, and a data update logic is constructed ((3) in FIG. 13). For example, it is defined that a result of a logical OR on a set of addresses respectively corresponding to the state flags 401 to 404 (variable names ST1 to ST4) be stored as the validity check data.

In accordance with such a procedure, a variable name indicating the validity check data designated from support device 200 is defined in the CPU unit 100, and, in the CPU unit 100, a logic for updating the defined validity check data is automatically constructed. For a search for a network address as described above, the variable table and the network configuration and so on stored in the CPU unit 100 are referred to.

The variable name used as the validity check data and the input data being a target of the validity check data, which are transmitted from the support device 200 to the CPU unit 100, may be defined using a function block in the user program as shown in FIG. 8(A).

Figure 14:
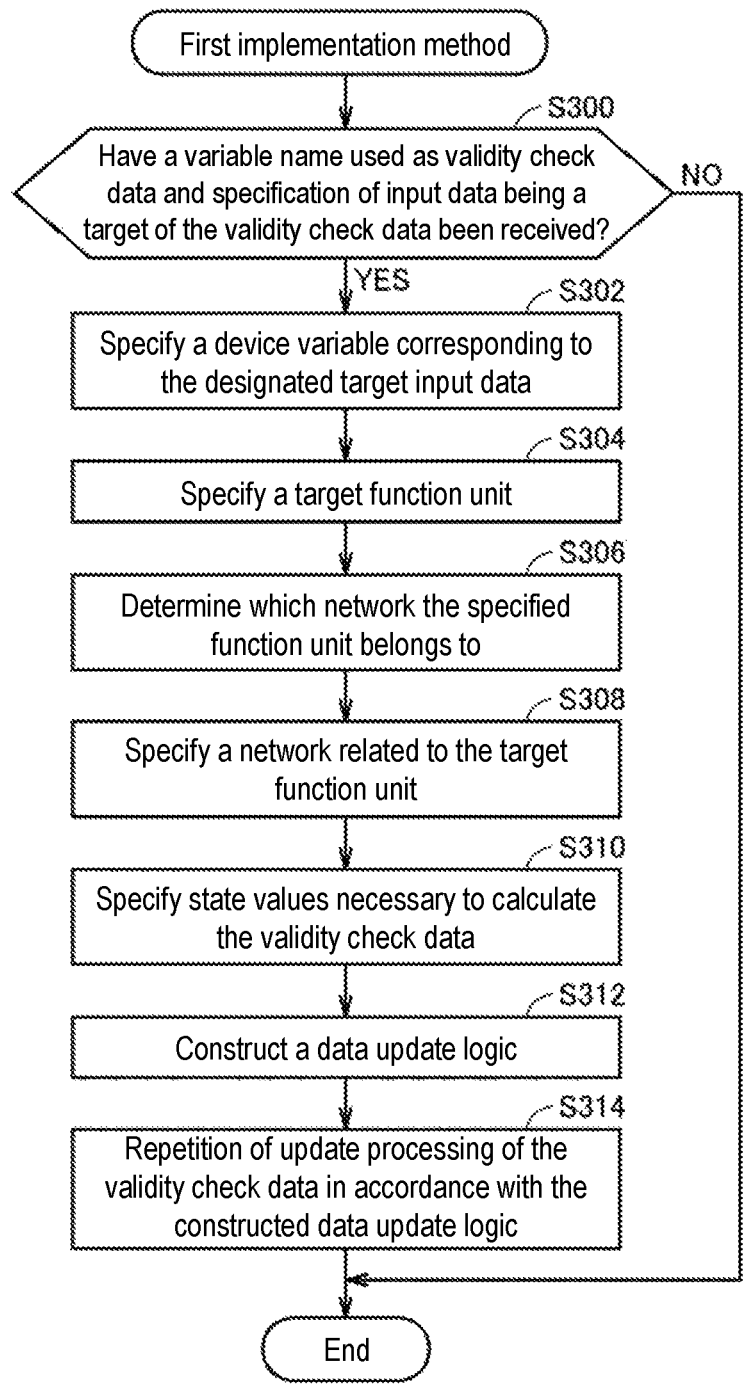
FIG. 14 is a flowchart showing a processing procedure according to the third implementation method for providing validity check data in the control system according to the present embodiment.

Next, a processing procedure according to the third implementation method is explained. FIG. 14 is a flowchart showing a processing procedure according to the third implementation method for providing validity check data in the control system 1 according to the present embodiment. Typically, each step shown in FIG. 14 is performed by the processor 102 of the CPU unit 100 executing the system program 108a (see FIG. 2).

Referring to FIG. 14, the CPU unit 100 of the PLC 2 determines whether or not a variable name used as the validity check data and specification of input data being a target of the validity check data have been received from the support device 200 (step S300). If these pieces of information have not been received (NO in step S300), the following processing is skipped.

If these pieces of information are received (YES in step S300), the CPU unit 100 specifies a device variable corresponding to the designated target input data (step S302), and specifies a target function unit from an address of the specified device variable (step S304). Subsequently, the CPU unit 100 determines which network the specified function unit belongs to (step S306), and specifies the network related to the target function unit (step S308).

In this way, in response to the data being the target of the validity check data and the variable name used as the validity check data associated with the target data, the CPU unit 100 specifies a function unit holding the target data, and specifies a transmission path from the specified function unit to the CPU unit 100.

Based on a network address and a state value address of the function unit managing the specified network and so on, the CPU unit 100 specifies state values necessary to calculate the validity check data (step S310), and constructs a data update logic (step S312). Then, the CPU unit 100 repeats the update processing of the validity check data in accordance with the constructed data update logic (step S314).

In this way, the CPU unit 100 adds a command for updating the result of aggregation of the states of each of the communication units present on the specified transmission path as the value indicated by the designated validity check variable every predetermined cycle.

As described above, in the third implementation method, when specific input data is designated and the validity check variable indicating the validity check data to be associated with the input data is designated in the support device 200, the logic for calculating the designated validity check data is automatically constructed in the CPU unit 100. Hence, the user can create the user program without considering which hardware is used to collect the designated input data. By employing such a configuration, efficiency of creation of the user program can be improved. In addition, in the third implementation method, since the validity check data is held inside the CPU unit 100, the validity check data can be accessed from any external device connected to the CPU unit 100.

G. Other Implementations

In the first to third implementations described above, a method of determining a logic or algorithm for calculating the validity check data according to the hardware configuration and the network configuration of the control system 1 at a timing when processing is performed has been exemplified. After the logic or algorithm has been determined, if a change occurs in the hardware configuration or the network configuration, such as addition, change or disuse of some unit, the occurrence of the change may be detected so as to reconstruct the logic or algorithm. By employing such an automatic reconstruction method, the necessary algorithm or logic can be dynamically optimized for the configuration change in the control system 1.

H. Advantages

According to the control system and the control device constituting the control system according to the present embodiment, in developing a user program that uses some input data, a user (typically, a developer of the user program) does not need to be aware of via what kind of hardware and network the input data is collected. If the user designates the validity check data corresponding to the input data to be used in the user program, the validity check data reflecting one or a plurality of pieces of status information corresponding to a transmission path of the designated input data or the like can be used.

In addition, since the value of the validity check data is updated based on the logic or algorithm constructed according to the hardware configuration and the network configuration of the control system, even if a configuration change occurs later, response is possible without changing the user program.

In this way, according to the present embodiment, efficient programming can be realized even in a multistage or highly networked control system.

The embodiments disclosed herein are examples in all aspects and should not be interpreted as limitations. The scope of the present invention is indicated by claims instead of the above descriptions, and it is intended to include all modifications within the scope of the claims and the equivalents thereof.

What is claimed is:

1. A control system, comprising:
   a processing unit that executes a user program;
   a plurality of function units;
   a plurality of communication units that relay data between the processing unit and the plurality of function units; and
   a support device connected to the processing unit, wherein when a variable associated with any data held by the function units and indicating validity of the data is designated in the user program, the support device reflects a result of aggregation of state flags as a value indicated by the variable,
   wherein the result of aggregation of state flags is a flag obtained by performing a logical AND operation on the state flags, the state flags are disposed in series, and the flag indicates that each of the communication units present on a transmission path from the function units holding designated data to the processing unit is sound.

2. The control system according to claim 1, wherein
   the support device analyzes a source code of the user program in which the variable is designated and specifies the plurality of communication units related to determination of the value indicated by the variable; and
   after adding to the source code a command for determining the value indicated by the variable from a set of values indicating the state of the specified plurality of communication units, the support device generates an object code of the user program.

3. The control system according to claim 2, wherein a network in accordance with a predetermined protocol is configured between the communication units.

4. The control system according to claim 1, wherein
   the support device analyzes a source code of the user program in which the variable is designated and specifies the plurality of communication units related to determination of the value indicated by the variable; and
   the support device adds a function of updating and holds the value indicated by the variable based on specified information in the processing unit.

5. The control system according to claim 4, wherein the support device performs analysis of the source code of the user program and transmits information specified by the analysis to the processing unit.

6. The control system according to claim 5, wherein a network in accordance with a predetermined protocol is configured between the communication units.

7. The control system according to claim 4, wherein a network in accordance with a predetermined protocol is configured between the communication units.

8. The control system according to claim 1, wherein a network in accordance with a predetermined protocol is configured between the communication units.

9. A control system, comprising:
   a processing unit that executes a user program;
   a plurality of function units; and
   a plurality of communication units that relay data between the processing unit and the plurality of function units;
   wherein when a variable associated with any data held by the function units and indicating validity of the data is designated in the user program, the processing unit reflects a result aggregation of state flags as a value indicated by the variable,
   wherein the result of aggregation of state flags is a flag obtained by performing a logical AND operation on the state flags, the state flags are disposed in series, and the flag indicates that each of the communication units present on a transmission path from the function units holding designated data to the processing unit is sound,
   wherein in response to receiving target data and a variable name associated with the target data, the processing unit specifies the function units holding the target data, and specifies a transmission path from the specified function units to the processing unit; and
   the processing unit adds a command for updating, as the value indicated by the designated variable, the result of aggregation of the states of each of the communication units present on the specified transmission path every predetermined cycle.

10. The control system according to claim 9, wherein the value indicated by the variable is configured to be accessible from an external device connected to the processing unit.

11. The control system according to claim 10, wherein a network in accordance with a predetermined protocol is configured between the communication units.

12. The control system according to claim 9, wherein a network in accordance with a predetermined protocol is configured between the communication units.

13. A control device, comprising:
   a processing unit that executes a user program; and
   a communication interface for communicating with a plurality of function units, wherein a plurality of communication units that relay data are disposed between the processing unit and the plurality of function units,
   wherein when a variable associated with any data held by the function units and indicating validity of the data is designated in the user program, the control device reflects a result of aggregation of state flags,
   wherein the result of aggregation of state flags is a flag obtained by performing a logical AND operation on the state flags, the state flags are disposed in series, and the flag indicates that each of the communication units present on a transmission path from the function units holding designated data to the processing unit is sound.

14. A non-transitory computer-readable recording medium comprising a control program being a control program executed by a computer, the computer comprising a processing unit that executes a user program, and a communication interface for communicating with a plurality of function units, wherein a plurality of communication units that relay data are disposed between the processing unit and the plurality of function units,
   wherein the control program causes the computer to execute instructions to:

when a variable associated with any data held by the function units and indicating validity of the data is designated in the user program, specify a transmission path from the function units holding designated data to the processing unit and the communication units present on the specified transmission path; and reflect a result of aggregation of state flags as a value indicated by the variable, wherein the result of aggregation of state flags is a flag obtained by performing a logical AND operation on the state flags, the state flags are disposed in series, and the flag indicates that each of the communication units present on a transmission path from the function units holding designated data to the processing unit is sound.

* * * * *